United States Patent [19]
Juhasz

[11] 3,812,816
[45] May 28, 1974

[54] DIFFERENTIAL PRESSURE INDICATOR WITH INTERNAL RESET

[75] Inventor: Charles Juhasz, West Caldwell, N.J.

[73] Assignee: The Carborundum Company, Niagara Falls, N.Y.

[22] Filed: Mar. 1, 1972

[21] Appl. No.: 230,880

[52] U.S. Cl. ................................. 116/70, 210/90
[51] Int. Cl. ............................................ G01l 19/12
[58] Field of Search ........ 116/70, 117, 65; 137/110; 210/90

[56] References Cited
UNITED STATES PATENTS

| | | | |
|---|---|---|---|
| 2,954,751 | 10/1960 | Barnes, Jr. | 116/70 |
| 3,119,367 | 1/1964 | Barnes, Sr. et al. | 116/70 |
| 3,154,049 | 10/1964 | Smith et al. | 116/70 |
| 3,216,571 | 11/1965 | Whiting et al. | 210/90 |
| 3,379,206 | 4/1968 | Whiting | 137/110 |
| 3,499,415 | 3/1970 | Gutkowski | 116/70 |
| 3,502,048 | 3/1970 | Bentzen et al. | 116/70 |

Primary Examiner—Louis J. Capozi
Attorney, Agent, or Firm—David E. Dougherty; William H. Holt

[57] ABSTRACT

A differential pressure indicator is described in which a pressure sensitive means is arranged to respond to an increase in differential pressure within a fluid system. This means is operatively associated with an indicator which provides a signal when the differential pressure in the fluid system exceeds a set limit. At this point, the pressure sensitive means is locked in place and neither the indicator signal or the pressure sensitive means can be reset until the cause of the increased differential pressure is corrected. A thermally sensitive element is incorporated in the pressure sensitive means to prevent false pressure responses when the fluid may be in a more viscous state at low temperature.

8 Claims, 6 Drawing Figures

DIFFERENTIAL PRESSURE INDICATOR WITH INTERNAL RESET

BACKGROUND OF THE INVENTION

The measurement of differential pressure is a frequent requirement in fluid systems. At the present time, there are a number of differential pressure indicators on the market which are capable of sensing specific differential pressure values. These indicators provide a visual, electrical or some other desired signal when a specific differential pressure is exceeded.

One characteristic, common to all of these indicators, is that the indication either disappears or can be manually eliminated as soon as the differential pressure is removed. This characteristic is undesirable in many applications, such as in monitoring filters. With filters, the differential pressure indicator is used to indicate when the useful life of a filter element has been expended. Customarily, the filter element reaches the end of its useful life during an operating cycle. This event is observed and signaled by the differential pressure indicator. Servicing of the filter, however, does not usually take place until a subsequent shut down of the system. On the other hand, during this shut down the differential pressure does not exist and, therefore, it is possible to reset the indicator either inadvertently or willfully and thus eliminate the signal calling for changing the filter element. In order to avoid such possibilities as described above, the invention provides a differential pressure indicator for a filter element which locks the signaling indicator after a differential pressure indication has taken place. The invention further provides a locking means that cannot be reset unless the filter element is removed from its housing and the indicator is unlocked internally. The invention further provides a temperature sensing device which functions to prevent an indicator signal due to fluids having high viscosities at low temperatures.

SUMMARY OF THE INVENTION

The invention pertains to a pressure sensitive indicating device, the device having a pressure sensitive means and an indicator operatively associated with it, the pressure sensitive means moving under the influence of a differential pressure generated in a fluid handling system to allow a suitable indication when a certain pressure difference exists over parts of the system, the device having a locking means which insures that the indication will remain until the causes of the pressure difference are corrected. The device also contains a temperature sensitive element that prevents an erroneous pressure indication due to possible viscosity effects generated by a fluid below its normal operating temperature.

DETAILED DESCRIPTION

Figure 1:
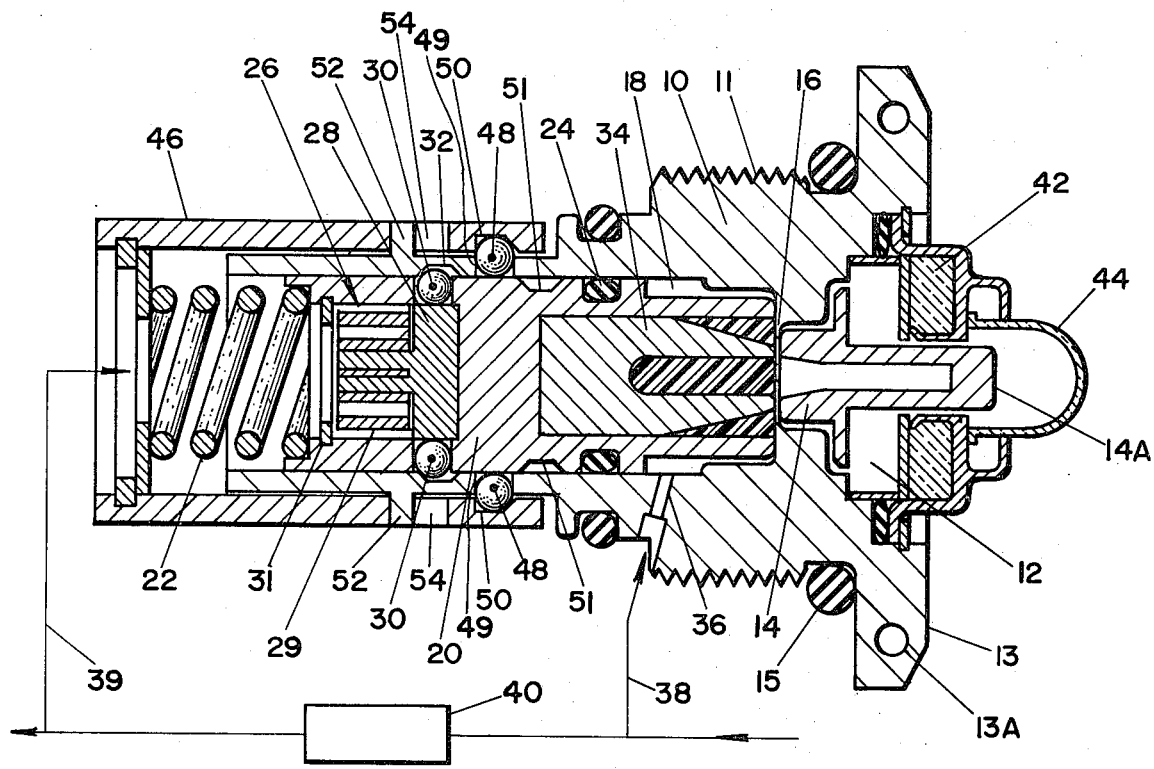
FIG. 1 shows a sectional view of the differential pressure indicator in normal, non-indicating position.

The pressure-sensitive device of the invention is shown in cross-section in FIG. 1. The device comprises a housing 10 of aluminum or other non-magnetic material, the housing being of substantially cylindrical shape. The upper part of the housing has a cylindrical cavity 12 in which an indicator 14 is positioned. This cavity is separated by the wall 16 from a cylindrical chamber 18. A piston 20 is arranged to move within the chamber and is urged in its first position toward the wall 16 by the spring 22. A circumferential slot encircles the piston and provides a holding means for the O-ring 24 which divides the chamber into a high pressure area at the head of the piston and an area of lower pressure below the piston. The piston includes thermally sensitive element 26 of essentially circular shape, the element being positioned in axial relationship to the piston and having a rotatable circular head 28 which presses against the first set of locking balls 30. These are in partial engagement with a corresponding inner circumferential slot 32 in the lower part of the chamber wall and prevent the piston 20 from moving in the chamber until the temperature of the activating fluid reaches a given point.

The head of the piston contains a magnet 34 which creates a magnetic field of sufficient strength to extend through the wall 16. The indicator 14 is composed of a magnetic material which is held in the non-indicating position by the attraction of the piston head magnet 34. For operation, the passageway 36 may be connected by means of a conduit 38 to a source of high pressure fluid, such as the up stream side of a filter system, including the filter element 40. A similar conduit 39 connects the downstream side of the filter to the chamber below the piston 20. As long as the filter elements remain effective, there is little difference between the pressure of the fluid entering the filter and that of the filtrate discharge. As the filter element nears the end of its life however, the difference in pressures increases and the piston 20 moves away from wall 16. This reduces the attraction of the piston magnet 34 upon the indicator 14, this indicator then becoming free to move into the indicating position under the attraction of the indicator magnets 42. The head 14A of the indicator is then visible within the dome 44, this dome being a flexible transparent material, such as a plastic.

Figure 2:
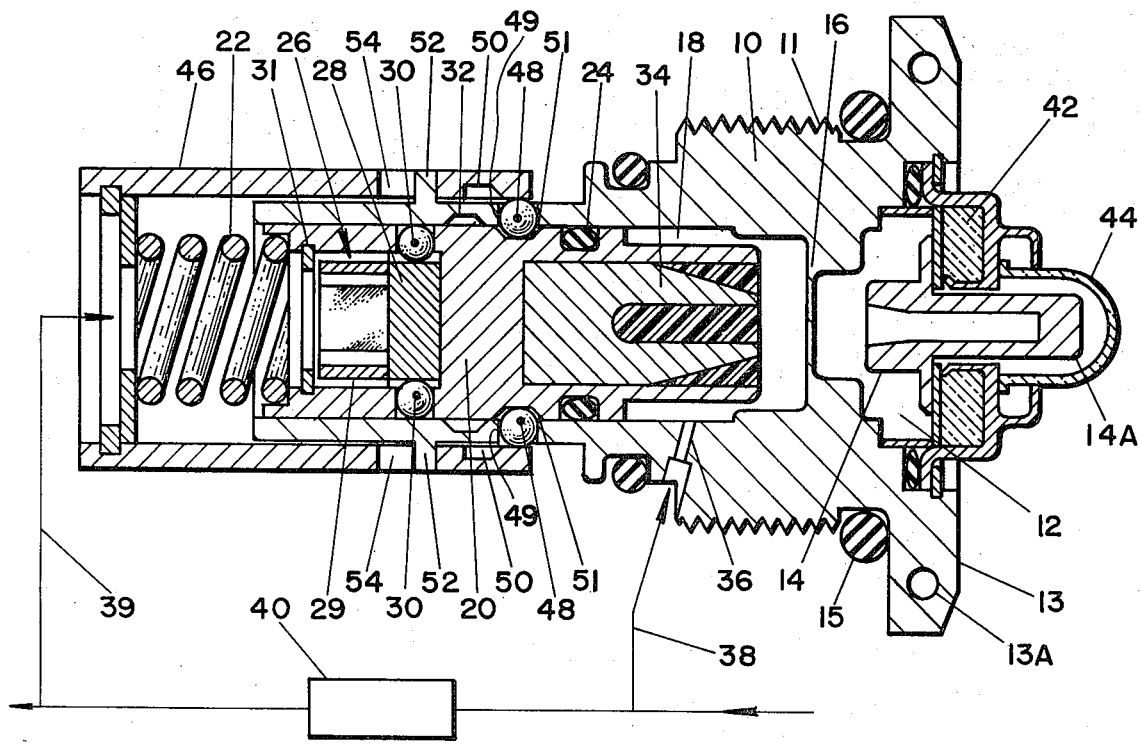
FIG. 2 shows the indicator of FIG. 1 in which the indicator shows a signal and the pressure sensing piston is locked in the indicating position.

The piston is secured in its second or lower position by a locking sleeve 46 which concentrically surrounds the lower part of the housing 10 and may slide upon it for a limited distance under the influence of the spring 22. The sleeve is in partial engagement with the second set of locking balls 48, these balls are held in suitable openings 49 in the housing wall and are in partial engagement with cavities 50 in the locking sleeve, which is held in its initial position while the piston 20 is in its first position, as shown in FIG. 1. When the piston has moved into its second position, as shown in FIG. 2, the second set of locking balls 48 are urged into partial engagement with the circumferential slot 51 formed in the piston. The balls are urged into the piston slot by the camming action of the cavities 50 as the locking sleeve 46 slides to its final position under the influence of spring 22. The movement of the locking sleeve is limited by the pins 52 which extend from the housing into linear slots 54 formed in the locking sleeve. The piston will now remain in the second position even if the differential fluid pressure that forced it down is removed, for example, by changing the filter element 40. The indicator 14 may be manually returned to the non-indicating position but will not remain there as long as the piston 20 is locked in the withdrawn or second position, as shown in FIG. 2. The piston can be released only by manually returning the locking sleeve 46 to its initial position as shown in FIG. 1. The locking balls 48 are then released from piston engagement and the piston may then move back into its first position, assuming there is no differential pressure upon it. The indicator 14 may then be manually returned to the non-indicating position and will be retained there by the attraction of the piston magnet 34.

Figure 3:
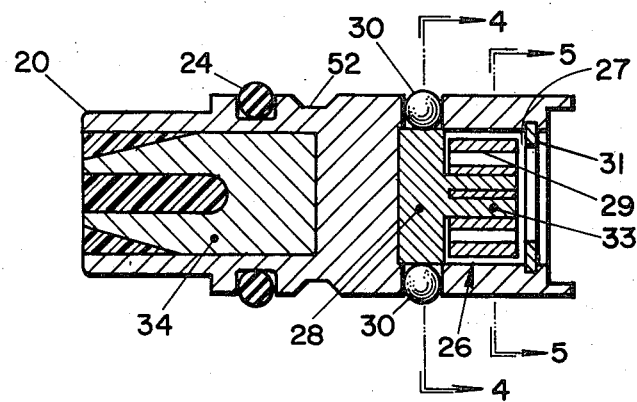
FIG. 3 shows a sectional view of the pressure sensing piston and thermal responsive element.
Figure 4:
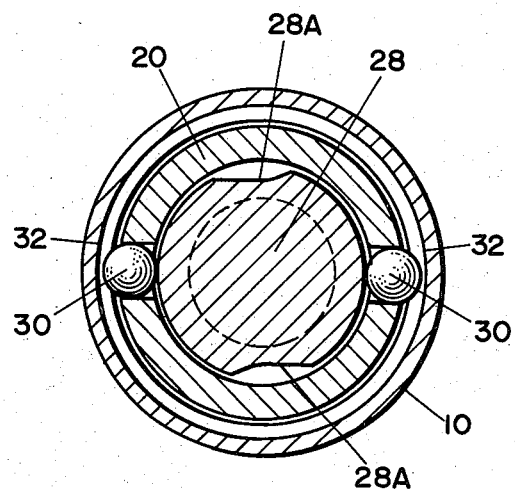
FIG. 4 shows a sectional view of the thermal responsive element, taken along the section line 4—4 of FIG. 3.
Figure 5:
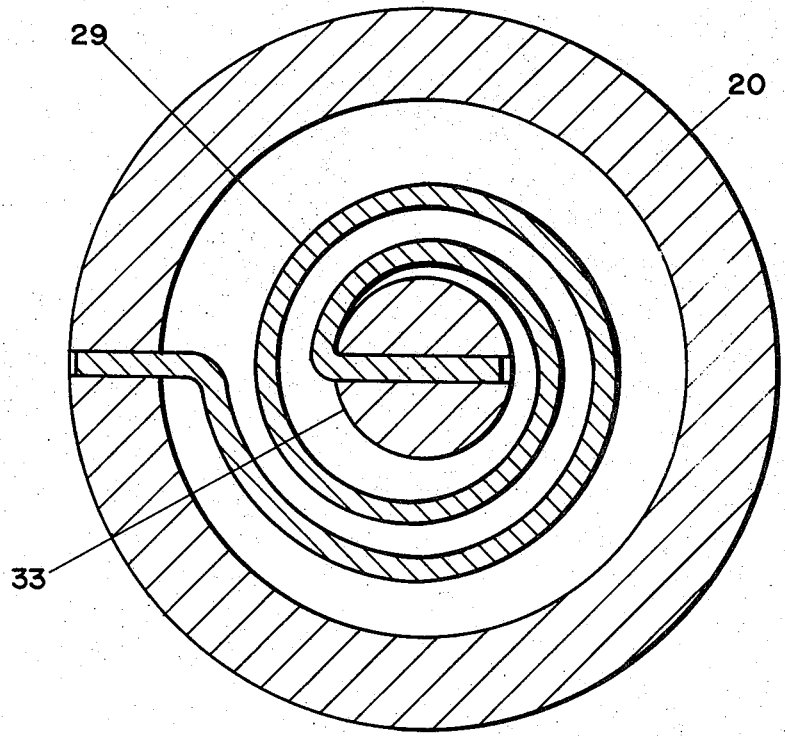
FIG. 5 shows a sectional view of the bi-metal thermal sensing strip, taken along the section line 5—5 of FIG. 3.

In some filtration operations, fluids are used which have relatively high viscosities when cold, a common example being a lubricating oil system for an internal combustion engine. Due to this high starting viscosity, a filter may exhibit high fluid flow resistance with a corresponding high differential pressure while the oil is cold, although the flow resistance and differential pressure will decrease later as the oil temperature increases. Since the initial differential pressure of the cold fluid is only a transitory effect, a temperature sensing element is necessary to prevent a false response by the differential pressure indicator. The operation of the temperature sensing element 26 may be explained in greater detail by reference to FIG. 3, where the element is shown in place at the non-magnetic end of the piston and in FIGS. 4 and 5 which show component parts of the element. The element 26 comprises a body which fits within a circular cavity 27 in the non-magnetic end of the piston. The element is secured in place by insertion of a split ring 31. The element has a head 28 which has two notches or cam surfaces 28A and which may be moved in a counter clockwise rotation by the action of a bi-metallic coil strip 29 (see FIG. 5) fastened at one end to the piston body 20 with the other end fastened to and importing rotation to the head shank 33 and head 28. The unlocking action of the head can be understood by reference to FIG. 4 where the head is shown in the starting low temperature position. In this position, a detent in the form of locking balls 30 are held in partial engagement within a circumferential slot 32 in the housing 10 and the piston is held in the first position, even though it may be under a differential pressure, due to the viscosity effect of the cold fluid. As the fluid temperature increases the head is moved in counter clockwise rotation by the expanding bi-metallic strip until the notches or cam surfaces 28A are moved into position behind the locking balls 30. The balls are then free to withdraw from partial engagement with the slot 32 and the piston is free to move in response to any fluid differential pressure, so long as the fluid temperature is maintained. The temperature sensing element may be constructed to respond within almost any desired temperature range by varying the metals or the length of the spiral in the bi-metallic strip 29. While the description of the invention recites balls as part of the locking means used in the pressure-sensitive device of the invention, the locking means is not limited to the use of balls alone but may also employ other bodies of suitable configuration to allow movable or sliding contact as required to fulfill the functions of the locking means.

Figure 6:
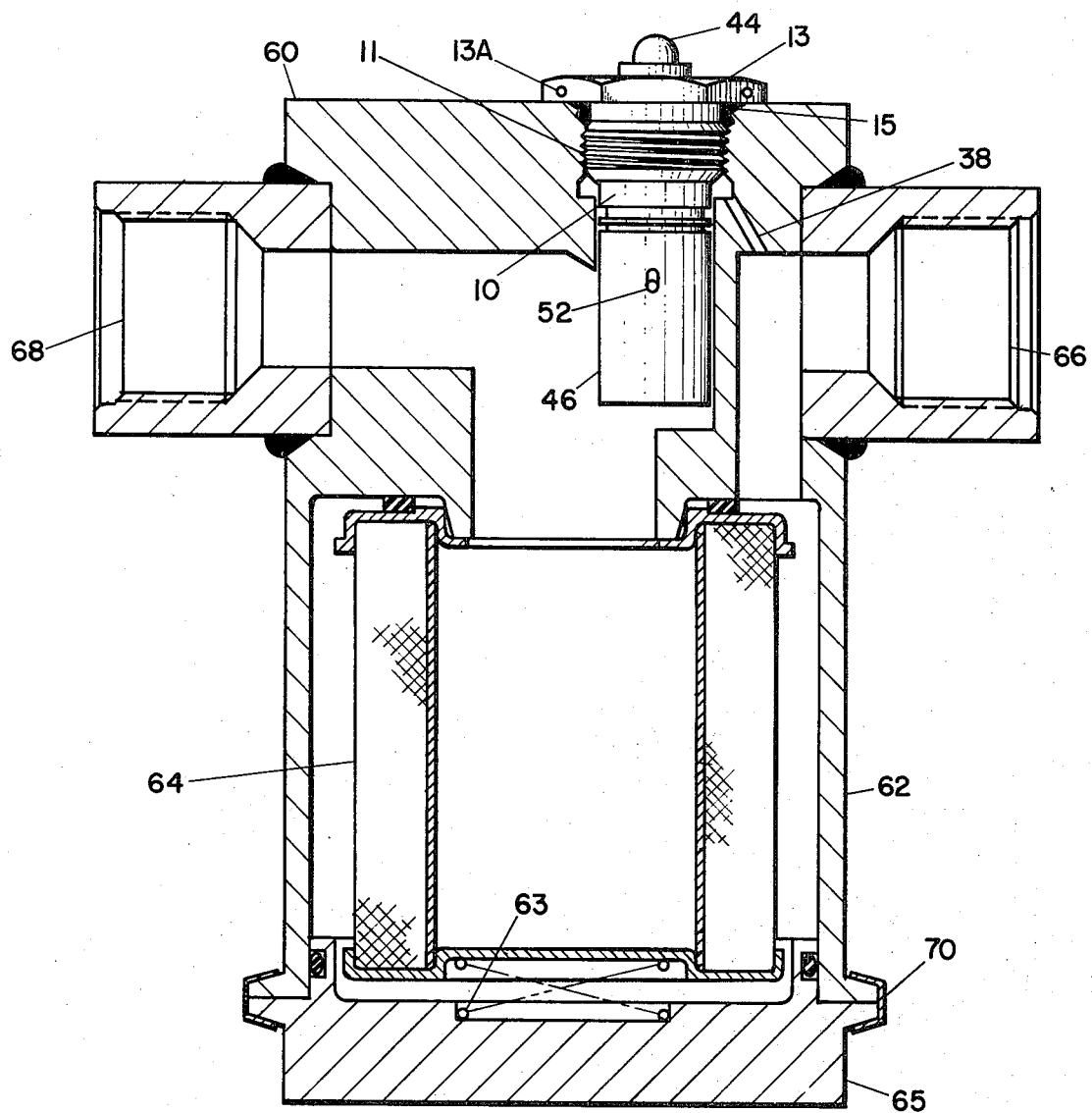
FIG. 6 shows the differential pressure indicator installed on a filter housing.

As mentioned previously, one of the advantages of the invention is that the indicating means is constructed to permit resetting only by an internal manual operation. While the differential pressure indicator may be incorporated in a control panel, separate from the filter, the preferred embodiment is shown in FIG. 6. In this assembly, the pressure indicator is installed directly in a filter housing head 60, the indicator housing having threads, as shown at 11 (see FIG. 1) and a hexagon shaped head 13, permitting the pressure indication to be assembled in suitable matching threads within a hole bored in the filter housing head 60. An appropriate seal is made by O-ring 15. As further shown in FIG. 6, a filter cartridge 64 is positioned below the filter housing head 60, the cartridge being held securely by the filter housing 62 and a spring 63 or other biasing means at the base 65 of the filter. The filter base 65 is secured to the housing 62 by a suitable clamp 70.

During operation, the fluid enters at inlet 66, passes through the filter and leaves at outlet 68. A passage 38 in the filter housing head is provided for transmitting the pressure of the entering fluid to the head of the piston in the differential pressure indicator 10. This is shown in the non-indicating position. As the filter cartridge 64 becomes clogged, the pressure differential between passage 38 and outlet 68 will steadily increase until at some point the piston will move to its second position and be locked there by action of the locking sleeve 46, as previously explained. From a consideration of FIG. 6, it is apparent that the locking sleeve 46 cannot be moved to reset the indicator unless the filter cartridge 64 is removed or the pressure indicator 10 is unscrewed from the filter housing head. This latter procedure is more cumbersome and may be forstalled by using appropriate wire seals threaded through holes 13A in the indicator head 13. This assembly, therefore insures that filter units will be replaced as required and will not be inadvertently neglected.

Although the figures suggest the use of the differential pressure indicators of the invention in vertical position, they are not restricted to this position alone but may be used in other positions as desired. While FIG. 6 shows an individual filter cartridge and housing, the invention may be used for monitoring a number of similar cartridges disposed in a common inlet housing, the filters having individual outlets and individual pressure indicators. Although oil was used as an example in an explanation of indicator action, the invention is not limited to the use of this fluid but may be a applied to systems using other fluids both organic and inorganic, as well as vapors and gases. In the drawings, the pressure sensitive means was shown as a piston; however, other pressure sensing means, such as a flexible metal diaphragm or bellows might be employed instead, the diaphragm or bellows co-acting with appropriate mechanical members to provide thermal control and locking action during operation.

What is claimed is:

1. A temperature sensitive differential pressure indicating device comprising:

a. a hollow housing having a chamber formed therein;

b. an indicator means located at one end of said housing and including an indicating member movable between a non-indicating position and an indicating position;

c. a piston disposed within said chamber and movable between a first position and a second position, biasing means for urging said piston towards said first position, and said chamber having openings therein for transmission of differential fluid pressure to said piston for moving said piston toward said second position;

d. a first locking means for locking said piston in said first position, said first locking means including temperature sensitive means operative below a predetermined temperature for holding said piston immovable within said chamber and operative above said predetermined temperature to release said piston for movement within said chamber to said second position;

e. a second locking means for locking said piston in said second position;

f. a first holding means for holding said indicator member in its non-indicating position when said piston is in its first position; and g. a second holding means for holding said indicator member in its indicating position when said piston is in its second position.

2. A device according to claim 1 in which said piston has a head adjacent to said indicator member, said first holding means comprising a magnet carried by said piston head.

3. A device according to claim 1 in which said second holding means comprises an indicator magnet located adjacent to said indicator member on a side thereof remote from said piston.

4. A device according to claim 1 wherein said piston has a cavity formed therein and is provided with at least one opening communicating with said cavity, said temperature sensitive means being positioned within said cavity and including a head, said housing having slot means formed interiorly thereof, detent means contained within said opening and held in said slot means by said head for locking said piston in said first position, notch means formed in said head, and means for rotating said head within said cavity for aligning said notch means with said detent means to allow said detent means to move out of said slot means and release said piston for movement to said second position.

5. A device according to claim 1 in which said second locking means comprises a sleeve surrounding said hollow housing in sliding relationship therewith, said sleeve having a cavity means formed interiorly thereof for engagement with at least one detent means, said chamber having a wall and an opening formed in the wall, said detent means being located within said opening, said piston having a slot means formed exteriorly thereon for partially receiving said detent means when said piston is in its second position, said sleeve having an initial position and a final position and biasing means for urging said sleeve towards said final position, said sleeve being retained in its final position by engagement with fixed pin means on said housing, said sleeve in said final position locking said piston in its second position by holding said detent means in said slot means formed exteriorly on said piston.

6. A device according to claim 1 werein said indicator member includes magnetically attractable material, a cavity located at one end of said housing and being defined by a wall member at one end and a flexible transparent dome at a second end, magnet means located within said cavity in spaced relation to said wall member, said indicator member being located within said cavity and movable between said wall member and said magnet means.

7. A temperature responsive device for controlling relative movement between first and second members, said first member including an opening extending therethrough; detent means located within said opening and having a portion partially protruding therefrom, said second member being disposed adjacent to said first member; slot means formed in said second member, said slot means being disposed in alignment with said opening and receiving said portion of said detent means; a temperature responsive element disposed adjacent to said first member on a side thereof remote from said second member and including a head disposed adjacent to said opening for holding said detent means within said opening and partially within said slot means; notch means formed within said head at a portion thereof remote from said opening; and means for rotating said head in response to a change in ambient temperature for locating said notch means adjacent to said opening; means for moving said portion of said detent means out of said slot means for locating said detent means in said opening and partially within said notch means; and means for causing relative movement between said first and second members upon movement of said portion of said detent means out of said slot means.

8. A temperature responsive device according to claim 7 including a shank attached to said head, said means for rotating said head comprising a bi-metallic strip encircling said shank, said strip having first and second ends, said first end being attached to said first member and said second end being attached to said shank.

* * * * *